US012455992B2

(12) United States Patent
Iwamura et al.

(10) Patent No.: US 12,455,992 B2
(45) Date of Patent: Oct. 28, 2025

(54) SIMULATION DEVICE, SIMULATION METHOD, AND NON-TRANSITORY COMPUTER-READABLE STORAGE MEDIUM STORING SIMULATION PROGRAM

(71) Applicant: OMRON CORPORATION, Kyoto (JP)

(72) Inventors: Shintaro Iwamura, Kyoto (JP); Haruna Ohnuki, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 826 days.

(21) Appl. No.: 17/825,548

(22) Filed: May 26, 2022

(65) Prior Publication Data

US 2022/0391561 A1 Dec. 8, 2022

(30) Foreign Application Priority Data

Jun. 7, 2021 (JP) .................. 2021-094862

(51) Int. Cl.
*G06F 30/20* (2020.01)
*G01M 99/00* (2011.01)

(52) U.S. Cl.
CPC ........... *G06F 30/20* (2020.01); *G01M 99/005* (2013.01)

(58) Field of Classification Search
CPC ...... G06F 30/20; G06F 2111/10; G06F 30/23; G06F 30/17; G06F 2119/14; G01M 99/005; G05B 19/054; G05B 2219/13174
See application file for complete search history.

(56) References Cited

U.S. PATENT DOCUMENTS

| 2008/0294397 A1 | 11/2008 | Ohnishi |
| 2012/0265498 A1 | 10/2012 | Choi et al. |
| 2017/0004237 A1 | 1/2017 | Sasaki |
| 2019/0129366 A1* | 5/2019 | Skeffington .......... G05B 13/041 |
| 2020/0320175 A1 | 10/2020 | Roberts et al. |

FOREIGN PATENT DOCUMENTS

| CN | 104978456 A | 10/2015 |
| CN | 108038285 A | 5/2018 |
| CN | 112395685 A | 2/2021 |

(Continued)

OTHER PUBLICATIONS

Bugday M, Karali M. Design optimization of industrial robot arm to minimize redundant weight. Engineering Science and Technology, an International Journal. Feb. 1, 2019;22(1):346-52. (Year: 2019).*

(Continued)

*Primary Examiner* — Chuen-Meei Gan
(74) *Attorney, Agent, or Firm* — Sughrue Mion, PLLC

(57) ABSTRACT

A stress generated in each of a plurality of components is calculated during simulation using a machine including these components. A simulation device includes a storage that stores assembly data of a machine including a plurality of components and a program for control of a driver connected to machine, and a controller configured to execute a simulation of machine. The controller causes driver to operate in the simulation and calculates a stress generated in each of the plurality of components in the simulation in response to driver being driven.

18 Claims, 13 Drawing Sheets

(56) References Cited

FOREIGN PATENT DOCUMENTS

| | | | |
|---|---|---|---|
| JP | 2002-324087 A | 11/2002 | |
| JP | 2003-141192 A | 5/2003 | |
| JP | 2008-287520 A | 11/2008 | |
| JP | 2013-512522 A | 4/2013 | |
| JP | 2017-16458 A | 1/2017 | |
| JP | 2020-75329 A | 5/2020 | |
| JP | 2020-185631 A * | 11/2020 | ............... B25J 9/22 |
| JP | 2021-045797 A | 3/2021 | |

OTHER PUBLICATIONS

Communication issued Nov. 5, 2024 in Japanese Application No. 2021-094862.
Chinese Office Action dated Mar. 25, 2025 in Application No. 202210579429.5.
Extended European Search Report dated Nov. 7, 2022 in European Application No. 22175783.4.
Bugday Mustafa et al: "Design optimization of industrial robot arm to minimize redundant weight", Engineering Science and Technology, an International Journal, 2019, vol. 22, No. 1, pp. 346-352 (7 pgs total).
Nguyenski Lab: "Simulate and Control Robot Arm with MATLAB and Simulink Tutorial (Part I)", Mar. 29, 2021, https://www.youtube.comwatch?v=xpA8TKEMpMk (2 pgs total).
Matlab: "Structural Analysis Using Finite Element Method (FEM) in MATLAB | Part 1", Nov. 4, 2020, https://www.youtube.com/watch?v=l36l61vok (2 pgs total).
Lad Robotics: "ANSYS tutorial of a Robotic finger/Robotic Hand (FEA Computer Simulation)-LAD", May 29, 2021, https://www.youtube.com/watch?v=sHbW0luVQk8 (2pgs total).

* cited by examiner

MATERIAL ALLOWABLE STRESS = REFERENCE STRENGTH/SAFETY RATE

| COMPONENT NAME | MATERIAL | MINIMUM THICKNESS | SCREW DIAMETER |
|---|---|---|---|
| COMPONENT 151 | ALUMINUM | 4mm | |
| COMPONENT 153, 154 | IRON | | M4 |
| COMPONENT 152 | DURALUMIN | 2mm | |

AFTER COMPONENT OPTIMIZATION

| COMPONENT NAME | MATERIAL | MINIMUM THICKNESS | SCREW DIAMETER |
|---|---|---|---|
| COMPONENT 151 | ALUMINUM | 4mm | |
| COMPONENT 153, 154 | IRON | | M4 |
| COMPONENT 152 | ALUMINUM | 3mm | |

SIMULATION DEVICE, SIMULATION METHOD, AND NON-TRANSITORY COMPUTER-READABLE STORAGE MEDIUM STORING SIMULATION PROGRAM

BACKGROUND OF THE INVENTION

Field of the Invention

The present disclosure relates to simulations, more particularly to the simulation of stresses generated in a machine including a plurality of components.

Description of the Background Art

Computer-assisted simulations have been applied to various technical fields. Such simulations may be a great help for preliminary discussions and considerations of devices and apparatuses even before they are ready to be used.

Japanese Patent Laying-Open No. 2021-045797 describes an apparatus usable for the simulations. This apparatus is provided with a first behavior calculator and a second behavior calculator. The first behavior calculator calculates the behavior of a first target disposed in a virtual space that corresponds to a first device mounted with an accessory device. The second behavior calculator calculates the behavior of a second target disposed in a virtual space that corresponds to a second device mounted with an accessory device. It is further described in this literature that, for each one of predetermined time steps, the first behavior calculator calculates the behavior of the first target corresponding to the first device mounted with the accessory device in the relevant time step, and the second behavior calculator calculates the behavior of the accessory device mounted on the first device on the basis of the calculated behavior of the first target (refer to the "Abstract").

SUMMARY OF INVENTION

In the technique described in Japanese Patent Laying-Open No. 2021-045797, when simulation using a machine including a plurality of components is executed, a stress generated in each of the plurality of components cannot be calculated. Thus, a technique is required that calculates a stress generated in each of a plurality of components at the time of simulation using a machine including the plurality of components.

The present disclosure has been made in view of the above background, and an object in an aspect is to provide a technique that calculates a stress generated in each of a plurality of components at the time of simulation using a machine including the plurality of components.

In an embodiment of this disclosure, a simulation device is provided. The simulation device includes: a storage configured to store assembly data of a machine including a plurality of components and a program for control of a driver connected to the machine; and a controller configured to execute a simulation of the machine. The controller is configured to cause the driver to operate in the simulation, and calculate a stress generated in each of the plurality of components in the simulation in response to the driver being driven.

As disclosed herein, the simulation device can calculate the stress generated in each component by executing the simulation using the operation of the machine including the plurality of components. This may allow a user to easily know details of the stress generated in each component under conditions of practical use.

In the simulation device disclosed herein, the machine is configured to come in contact with a work. Calculating the stress generated in each of the plurality of components includes calculating a stress generated in each of the plurality of components and a stress generated in the work in response to contact of the machine with the work.

As disclosed herein, the simulation device can calculate the stress generated in each of the plurality of components and in the work under the heaviest load being applied to these components and the work.

In the simulation device disclosed herein, the controller is configured to determine whether any one of the plurality of components is a bottleneck. Determining whether any one of the plurality of components is the bottleneck includes comparing an allowable stress of a target component to be determined against a stress generated in the target component to be determined.

As disclosed herein, the simulation device can determine whether any one of the plurality of components is the bottleneck under conditions of practical use.

In the simulation device disclosed herein, the controller is configured to suggest a combination of the plurality of components based on a safety rate of each of the plurality of components and a target function for optimization of the plurality of components.

As disclosed herein, the simulation device can suggest the combination of the components by which the machine's manufacturing cost is lowered to an extent that the safety rate is met.

In the simulation device disclosed herein, suggesting the combination of the plurality of components includes decreasing types of diameter sizes of screws to be used in the machine.

As disclosed herein, the simulation device may reduce a manufacturing cost of the machine by decreasing types of screws to be used in the machine production.

In the simulation device disclosed herein, suggesting the combination of the plurality of components includes decreasing types of materials to be used in the machine.

As disclosed herein, the simulation device may reduce a manufacturing cost of the machine by decreasing types of materials to be used in the machine production.

In the simulation device disclosed herein, suggesting the combination of the plurality of components includes reducing a manufacturing cost of the machine.

As disclosed herein, the simulation device may reduce the manufacturing cost of the machine.

In the simulation device disclosed herein, the controller is configured to output a parameter set for the combination of the plurality of components that has been suggested.

As disclosed herein, the simulation device can present, to a user, the parameter set for the combination of the plurality of components that has been suggested.

In the simulation device disclosed herein, outputting the parameter set may include outputting a table of the parameter set or displaying the parameter set on a simulation screen.

As disclosed herein, the simulation device may present, to a user, the table of the parameter set or the parameter set displayed on the simulation screen.

In another embodiment of this disclosure, a simulation method for a machine including a plurality of components is provided. The simulation method includes: referring to assembly data of the machine and a program for control of a driver connected to the machine; causing the driver to operate in the simulation; and calculating a stress generated in each of the plurality of components in the simulation in response to the driver being driven.

As disclosed herein, the simulation method can calculate a stress generated in each component by executing the simulation using the operation of the machine including the plurality of components. This may allow a user to easily know details of the stress generated in each component under conditions of practical use.

In yet another embodiment of this disclosure, a simulation program causing a computer to execute the above program is provided.

In yet another embodiment of this disclosure, a non-transitory computer-readable medium comprising instructions is provided. The instructions, when executed by a simulation device, cause the simulation device to: refer to assembly data of the machine and a program for control of a driver connected to the machine; cause the driver to operate in the simulation; and calculate a stress generated in each of the plurality of components in the simulation in response to the driver being driven.

As disclosed herein, the stress generated in each component can be calculated by causing the computer to execute the simulation using the operation of the machine including the plurality of components. This may allow a user to easily know details of the stress generated in each component under conditions of practical use.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the technical idea according to the present disclosure are hereinafter described with reference to the accompanying drawings. In the description below, like components are illustrated with the same reference signs. Also, they are referred to likewise and have similar functional features. Such components, therefore, will not be repeatedly described in detail.

A. Example of Application

Figure 1:
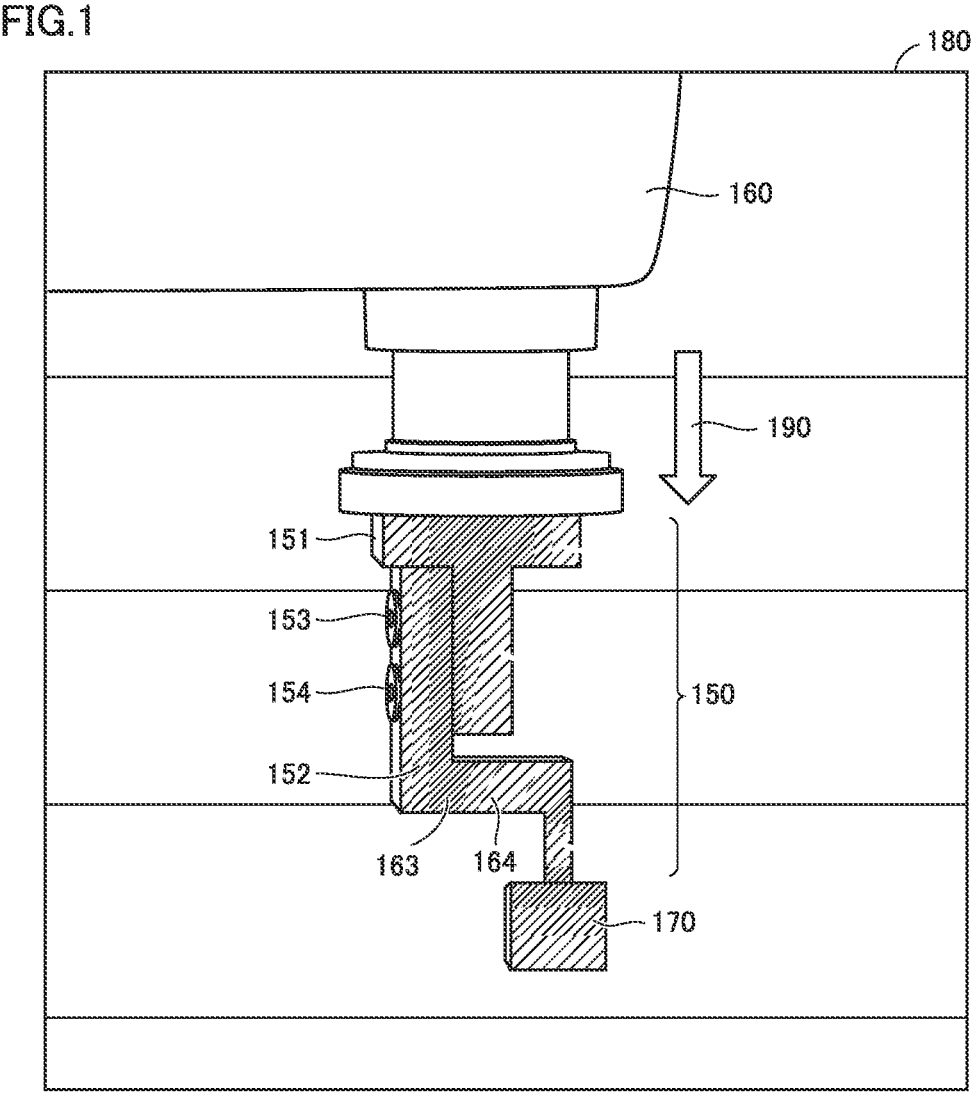
FIG. 1 is a diagram illustrating an example of a machine to which a simulation technique according to an embodiment is applicable.

FIG. 1 is diagram illustrating an example of a machine to which a simulation technique according to an embodiment is applicable. Referring to FIG. 1, an example to which the simulation technique according to this embodiment is applied is described. The simulation technique according to this embodiment is feasible by, for example, a device 100 (see FIG. 3). With this simulation technique, a machine including a plurality of components can be operated in a three-dimensional (3D) space, and a stress generated in each of the plurality of components can be calculated. The "machine" in this description includes optional devices mostly used in production lines of factories, such as tools mounted to robots, work holders, and other jigs.

(a. Simulation Screen Configuration)

A screen 180 is an exemplified screen offered by the simulation technique according to this embodiment, which projects a 3D space where the simulation is carried out. In the example illustrated in FIG. 1, screen 180 displays thereon a robot 160, a machine 150, and a work 170.

Machine 150 includes components 151, 152, 153 and 154. Machine 150 including the plurality of components is otherwise called an assembly including components 151, 152, 153 and 154. Likewise, any machine including robot 160 and other components is otherwise called an assembly.

Robot 160 is, for example, a vertical multi-joint robot, a horizontal multi-joint robot or any other optional robot. Robot 160 includes a driver. In the example illustrated in FIG. 1, machine 150 is mounted to a tool mounting portion at an edge of robot 160. Machine 150 is moved downward as indicated with an arrow 190 by robot 160 (driver) to press down work 170.

(b. Features Offered by Simulation Technique)

The simulation technique according to this embodiment provides two main features. The first feature is reproduction of the assembly operation in the 3D space. The second feature is calculation of stresses generated in work 170 and each components of machine 150 (assembly) present in the 3D space.

The first feature (reproduction of the assembly operation in the 3D space) is described. Device 100 stores, in a storage 111 (see FIG. 3), at least a simulation program, 3D data used in the simulation (3D data of machine 150, robot 160, work 170 and any other optional machines), and a program for robot 160.

Device 100 makes robot 160 operate in the 3D space based on the program for robot 160. As robot 160 operates, machine 150 also operates correspondingly. In the example illustrated in FIG. 1, machine 150 moves downward to press down work 170. A user may check whether the designed machine or program can properly operate without any trouble using the first feature (reproduction of the assembly operation in the 3D space).

Next the second feature (calculation of stresses generated in work 170 and each component of machine 150 present in the 3D space) is described. Device 100 calculates stresses generated in components 151, 152, 153 and 154 of machine 150 and a stress generated in work 170 during the simulation.

Specifically, device 100 may calculate stresses generated in components 151, 152, 153 and 154 of machine 150 and a stress generated in work 170 for each scene (for each snapshot) in the simulation. For instance, device 100 may calculate stresses generated in components 151, 152, 153 and 154 of machine 150 and a stress generated in work 170 in each of time slots (A) to (Z) in the simulation.

Further, device 100 may calculate stresses generated in components 151, 152, 153 and 154 of machine 150 and a stress generated in work 170 solely for a certain snapshot(s) that meets a particular condition. For instance, components 151, 152, 153 and 154 of machine 150 may be subject to the largest stress when machine 150 and work 170 are in contact with each other. Device 100, therefore, may calculate the stresses generated in components 151, 152, 153 and 154 of machine 150 and in work 170 for only a certain snapshot(s) meeting the condition that machine 150 and work 170 are in contact with each other. Device 100 may receive, through a setting screen, a user's input of the condition of a snapshot(s) for which the calculation of stresses is required.

Device 100 may visually display the stress generated in each of components 151, 152, 153 and 154 with shaded density or in color. In an aspect, device 100 may use numerical values for display of the stress generated in each of components 151. 152, 153 and 154.

The stress mostly occurs unevenly in one component. Device 10), therefore, may display the stress differently for each portion of the component. In the example of FIG. 1, for instance, a large stress is generated in a region 163 of component 152, while a small stress is generated in a region 164 of component 152.

In an aspect, device 100 may calculate only a stress generated in each component of an assembly designated by a user on the setting screen. In another aspect, stresses generated in all of components in the 3D space may be calculated by device 100.

A user may check stresses generated in work 170 and in each component, thereby reducing a stress greater than an allowable stress generated in a particular component and in work 170 by using the second feature (calculation of stresses generated in work 170 and in each component of machine 150 present in the 3D space).

The conventional stress calculation technique calculates a stress generated in only one component, but the simulation technique according to this embodiment calculates stress generated in each of a plurality of components of a machine (assembly).

The simulation technique according to this embodiment calculates a stress transmitted to each component of an assembly during the simulation being executed. Thus, a user may check a load on each component and easily identify any component of the assembly that may result in a bottleneck by simply carrying out the simulation.

B. System Configuration

Figure 2:
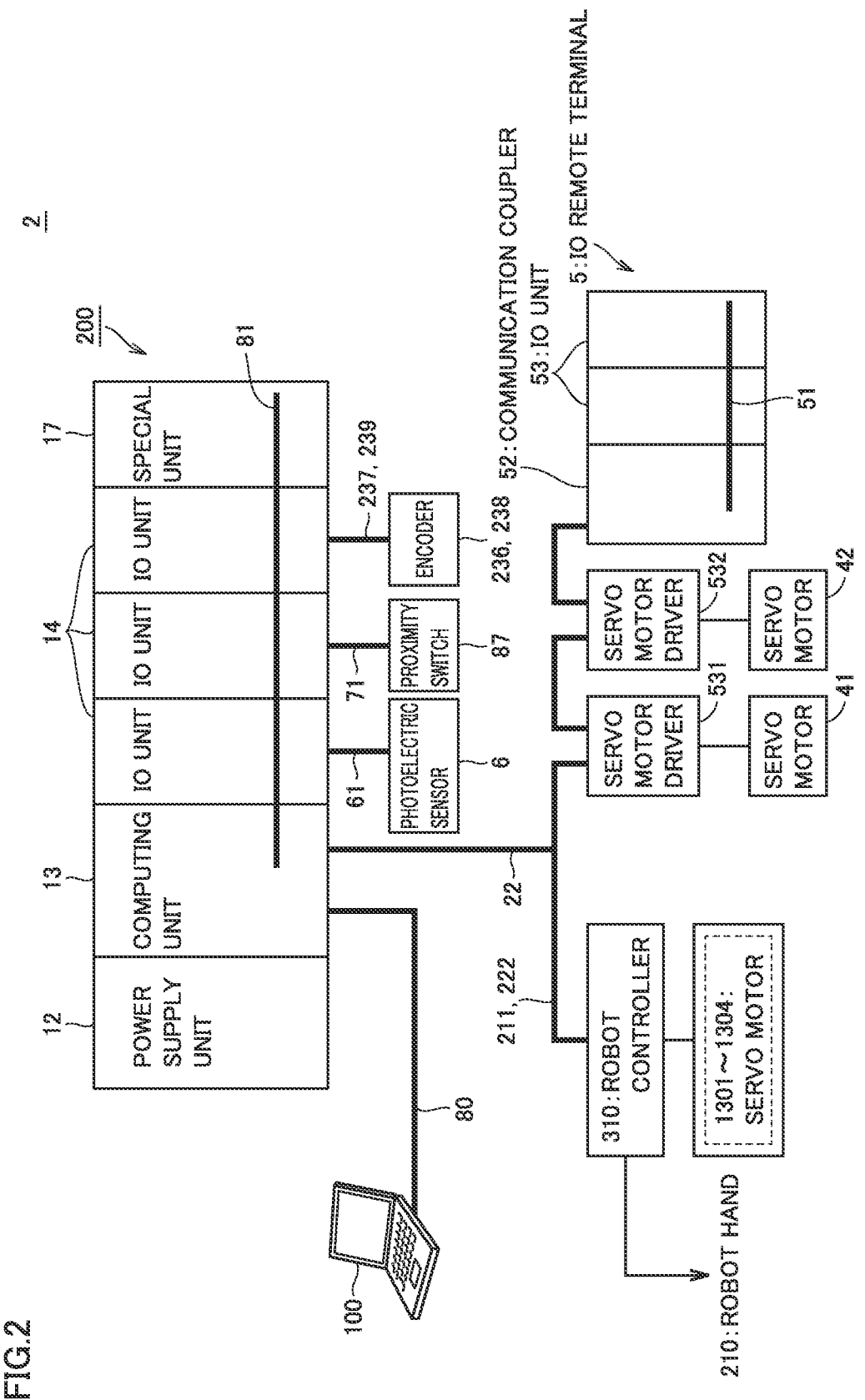
FIG. 2 is a diagram illustrating an example of a unit configuration of a control system 2 including the machine to which the simulation technique according to the embodiment is applicable.
Figure 3:
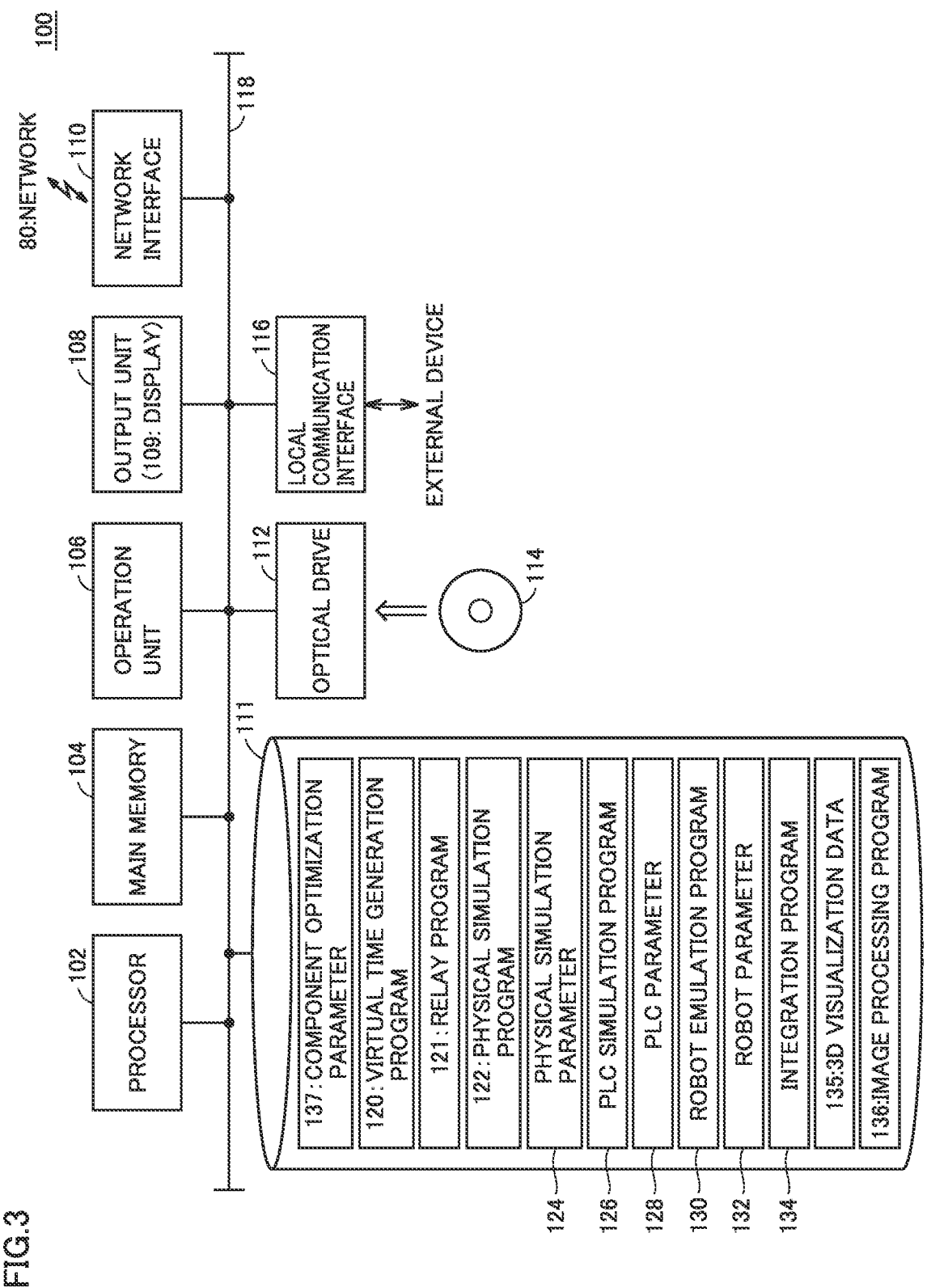
FIG. 3 is a diagram illustrating an example of a configuration of a device that executes simulation of stress generated in the machine.

Referring to FIG. 2, a system is described that includes a machine to which the simulation technique according to this embodiment is applicable. Referring to FIG. 3, device 100 is described that carries out the simulation technique according to this embodiment.

FIG. 2 is a diagram illustrating an example of a unit configuration of a control system 2 including a machine to which the simulation technique according to this embodiment is applicable. Robot 160 and machine 150 illustrated in FIG. 1 may operate as a part of control system 2. For example, robot 160 may be a robot hand 210 controllable by a robot controller 310 and servo motors 1301, 1302, 1303 and 1304. Machine 150 may be mounted to an edge of robot hand 210 or may be a jig driven by servo motors 41 and 42 and the like.

Control system 2 includes, for example, a programmable logic controller (PLC) 200, an IO remote terminal 5 and servo motor drivers 531 and 532 that are connected to PLC 200 through a field network 22, a robot controller 310, and IO devices disposed in the field (photoelectric sensor 6, proximity switch (or proximity sensor) 87 of a stopper or the like, and encoders 236, 238).

PLC 200 includes a computing unit 13 that executes main computing processes, one or more IO units 14, and a special unit 17. These units are configured to transmit and receive data to and from one another through a system bus 81 and are supplied with electric power from a power supply unit 12. A device 100 for simulation use is connectable to computing unit 13.

Device 100 may install a program(s) in a computing unit 13 after the operation of this program is verified in the 3D space. Computing unit 13 may control each device in control system 2 on the basis of the installed program. Device 100 may be connected to computing unit 13 through a network 80.

An IO unit 14 collects detected values 61, 71, 237 and 239 from the IO devices including photoelectric sensor 6, proximity switch 87 of a stopper or the like, encoders 236 and 238, and the like. For example, proximity switch 87 detects, in a non-contact manner, that a tray has approached the stopper to a predetermined distance. The detected values from the IO devices is set (written in) to corresponding bits of a memory of IO unit 14.

Computing unit 13 executes computations of the control program using values collected by IO unit 14 and sets (writes in) values of an obtained result to corresponding bits in IO unit 14. A peripheral device(s) or the IO devices are operated with reference to the bit values in IO unit 14. Thus, PLC 200 can control robot, conveyer, or the like, which are to be controlled, by transmitting and receiving data to and from the IO devices and the peripheral device(s) through IO unit 14.

Special unit 17 has features unsupported by IO unit 14, including input and output of analog data, temperature control, communication through a particular communication system.

For example, robot controller 310, servo motor drivers 531 and 532, IO remote terminal 5, and the like may be connected to field network 22.

As with IO unit 14, IO remote terminal 5 basically carries out typical processes associated with inputs and outputs. Specifically, IO remote terminal 5 includes one or more IO units 53 and a communication coupler 52 used to carry out processes associated with data transmission in field network 22. These units are configured to transmit and receive data to and from one another through an IO remote terminal bus 51.

Servo motor drivers 531 and 532 are connected to computing unit 13 through field network 22 and drive servo motors 41 and 42 in accordance with command values from computing unit 13. Specifically, servo motor drivers 531 and 532 receive, from PLC 200, command values including a position command value, a speed command value and a torque command value, at constant time intervals, for example, control periods. Computing unit 13 generates these command values based on detected values 237 and 239 from encoders 236 and 238.

Computing unit 13 refers to the detected values from the IO devices described above and runs a predetermined control program. Thus, computing unit 13 can make robot hand 210 (robot 160 or the like in FIG. 1) perform picking up, placing, pressing down and the like of work 170.

Specifically, computing unit 13 generates a control command 211 for the robot arm and a control command 222 for robot hand 210 and outputs these control command signals to robot hand 210 through robot controller 310. At the time of generating a control command 211, computing unit 13 may refer to a value indicative of the status of robot hand 210 in addition to detected values 61 and 71 from the IO devices described above. The robot arm may include an optional number of servo motors, for example, servo motors 1301 to 1304.

Computing unit 13 may control machine 150 actualized as a jig through servo motor drivers 531 and 532 and servo motors 41 and 42.

FIG. 3 is a diagram illustrating an example of a configuration of a device that executes simulation of stress generated in the machine. The simulation described with reference to FIG. 1 may be executed by software on device 100.

Device 100 includes, as its principal constituent elements, an operating system (OS), a processor 102 that executes programs described below, a main memory 104 that provides a working area to store data required by processor 102 to run the programs, an operation unit 106 (operation input receiver) including a keyboard, a mouse, or the like manipulated by a user, a display 109, indicators, an output unit 108 that outputs a processing result like a printing result, a network interface 110 connected to various networks including network 80, an optical drive 112, a local communication interface 116 that communicates with an external device(s), and a storage 111. These components art interconnected through an internal bus 118 in a manner that they are allowed to communicate data to and from one another.

Device 100 includes optical drive 112. Programs may be read through this optical drive from a computer-readable recording medium 114 and then installed into storage 111. Examples of computer-readable recording medium 114 may include optical recording media in which computer-readable programs are non-transitorily stored (for example, a digital versatile disc (DVD) or the like).

The programs to be executed by device 100 may be installed into device 100 through computer-readable recording medium 114 or may be installed into device 100 through network interface 110 from a server device or the like (not illustrated) on a network.

Storage 111 includes for example, a hard disk drive (HDD) or a flash solid state drive (SSD), and stores a program(s) executed by processor 102.

Specifically, storage 111 stores, as simulation programs to enable the simulation according to this embodiment, a virtual time generation program 120, a relay program 121, a physical simulation program 122, a PLC simulation program 126, a robot emulation program 130, and an integration program 134. Storage 111 further stores an image processing program 136 used to generate an image to display of an object in a virtual space.

Storage 111 stores a component optimization parameter 137, a physical simulation parameter 124, a PLC parameter 128, a robot parameter 132, and a 3D visualization data 135, which are necessary for the simulation program.

Virtual time generation program 120 generates virtual time for simulation. Device 100 executes a simulation at certain time intervals based on the virtual time. Processor 102 may generate a snapshot based on the virtual time and calculate stresses of work 170 and of components 151, 152, 153 and 154 in the snapshot.

Physical simulation program 122 calculates the behavior of a device (object) that operates in connection with the movement of work 170. Examples of the device, the behavior of which is calculated by physical simulation program 122, include photoelectric sensor 6, conveyer, tray, stopper, robot hand 210, and the like included in control system 2 illustrated in FIG. 2 and also include robot 160 and machine 150 feasible by these devices. Physical simulation program 122, based on the behavior of a device (machine) including a plurality of components, may calculate a stress generated in each component included in the device.

Physical simulation parameter 124 is used to define the behavior of each device (object) in the simulation and is referenced by physical simulation program 122. The value of physical simulation parameter 124 may be suitably changed through a user's operation, integration program 134, or the like.

Physical simulation parameter 124 may include computer aided design (CAD) data of work 170 and of a device(s) associated with transport or movement of work 170. Using the CAD data may allow processor 102 to accurately reproduce the behavior of a real device in the simulation.

PLC simulation program 126 calculates positions of work 170 and of a device(s), the behaviors of which are calculated by physical simulation program 122 PLC simulation program 126 outputs the calculated positions of work 170 and of a device(s) to physical simulation program 122.

PLC parameter 128 is used to calculate positions of work 170 and of a device(s), the behaviors of which are calculated by physical simulation program 122. This parameter is referenced by PLC simulation program 126.

Robot emulation program 130 reproduces the behavior of a robot connected to control system 2 in the simulation. Robot emulation program 130 reproduces the behavior of a robot connected to control system 2 using an object (CAD data or the like).

The robot included in control system 2 may include a robot that processes or transports work 170. The robot included in control system 2 may include robot 160 mounted with machine 150 illustrated in FIG. 1 (for example, robot that operates as a jig). Robot emulation program 130 reproduces the operation of the robot based on a calculation result (object's behavior) obtained by physical simulation program 122.

Robot parameter 132 includes a parameter(s) needed to reproduce the robot behavior using the object. This parameter is referenced by robot emulation program 130.

Relay program 121 offers a relay feature for data exchange between physical simulation program 122 and robot emulation program 130. Relay program 121 may be described with script or may be described in any other optional format.

Integration program 134 provides a feature that allows the following programs to operate in mutual cooperation; physical simulation program 122. PLC simulation program 126, robot emulation program 130 and relay program 121. Specifically, integration program 134 typically generates and updates, on main memory 104, virtual space information that describes the status of an object in the virtual space. Physical simulation program 122, PLC simulation program 126 and robot emulation program 130 each refer to (read) the virtual space information and execute a simulation process. These programs also reflect, among all of the obtained processing results, necessary information on the virtual space information. In other words, integration program 134 makes the programs operate in mutual cooperation and accordingly reproduces the behaviors and processes of the devices in the simulation.

Image processing program 136 presents, to a user, visual display of the current status of the simulation being executed. Image processing program 136 displays 3D visualization data 135 on display 109 based on the virtual space information. 3D visualization data 135 contains trace data and image data. The image data contains data (CAD data or the like) for use in rendering an object corresponding to a device to be simulated. The trace data contains a three-dimensional coordinate P (x, y, z) calculated by applying a given mathematical function to the position of each device in the virtual space information and chronological data relevant to this coordinate P. Image processing program 136 generates image data which is used to three-dimensionally render the behaviors of objects such as work 170, robot 160 and machine 150 in the 3D space using 3D visualization data 135. Then, image processing program 136 outputs the generated image data to display 109.

Component optimization parameter 137 contains materials, allowable stress, spec- or cost-related information of each component. This parameter is referenced by physical simulation program 122. Physical simulation program 122 may select the configuration of a component reduced in cost and meeting a required safety rate by comparing the simulation result (stress generated in each component) with component optimization parameter 137. For instance, physical simulation program 122 may decide (or suggest) the configuration of a component so as to use screws of the same diameter as much as possible. Otherwise, physical simulation program 122 may decide (or suggest) the configuration of a component so as to use the same type of material as much as possible. Otherwise, physical simulation program 122 may decide (or suggest) the configuration of a component so as to reduce the number of components as much as possible. In an aspect, a program other than physical simulation program 122 may optimize the configuration of a component.

In an aspect, the simulation described with reference to FIG. 1 may be executed as software by a system including a plurality of devices 100 or including at least a part of hardware configurations of device(s) 100. Otherwise, the simulation may be executed as software by a virtual machine on a cloud platform including at least a part of hardware configurations of device(s) 100.

Any processes and features necessary for the simulation described with reference to FIG. 1 may be accomplished in part by device 100 using an application specific integrated circuit (ASIC), a field-programmable gate array (FPGA), or the like.

C. Simulation

Next, referring to FIGS. 4 to 11, steps of calculating the stresses generated in work 170 and in components 151, 152, 153 and 154 of machine 150, and optimization of the components carried out by device 100 are hereinafter described.

Figure 4:
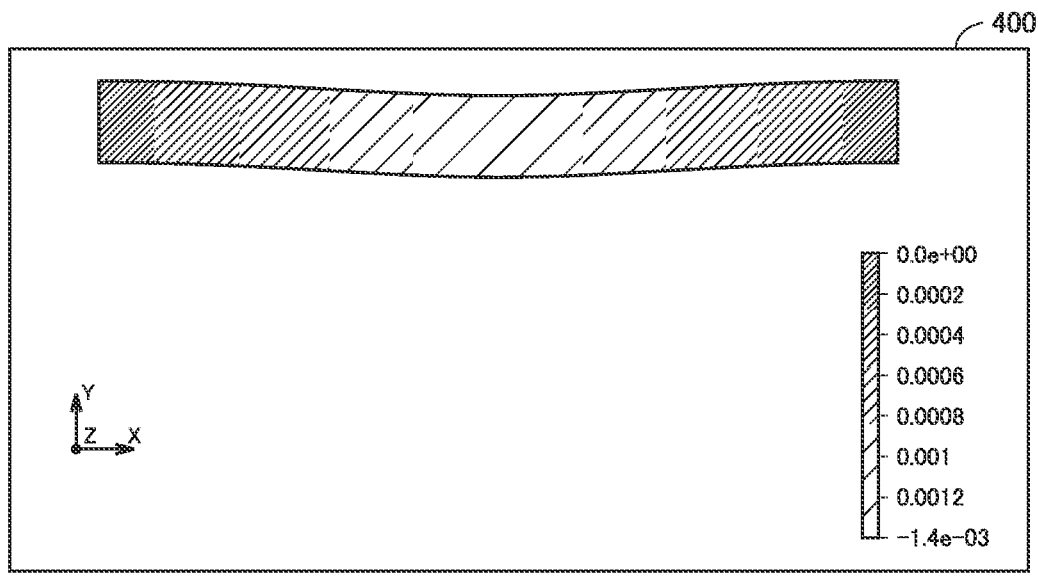
FIG. 4 is a diagram illustrating an example of stress generated in a material.

FIG. 4 is a diagram illustrating an example of stress generated in a material. A screen 400 presents a stress generated in one component (or material). A person in charge of designing a machine such as a jig may individually check the stress generated in each of the plurality of components of the machine as illustrated in FIG. 4. However, the method of individually checking the stresses in the plurality of components may be very time-consuming. The method of individually checking the stresses in the components has also a problem that it is difficult to exactly know what a stress is specifically generated on each component during the simulation. Therefore, device 100 greatly reduces a designer's workload by including stress calculation in the simulation settings.

Figure 5:
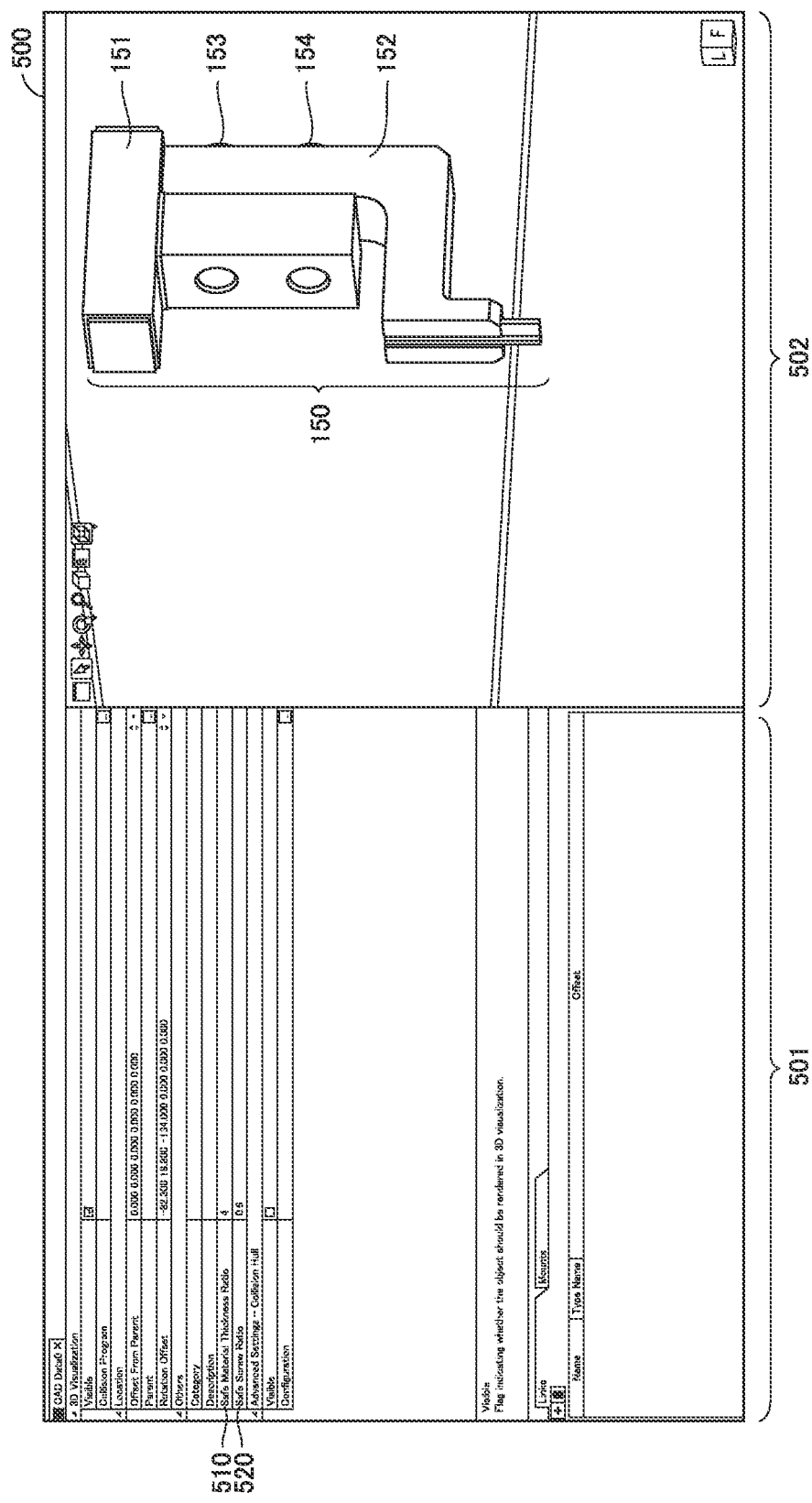
FIG. 5 is a diagram illustrating an example of a simulation setting screen 500.

FIG. 5 is a diagram illustrating an example of a simulation setting screen 500. Setting screen 500 includes a setting menu 501 and a 3D space display 50.

Setting menu 501 receives a user's input for simulation settings. The setting items on setting menu 501 include a safe material thickness ratio 510 and a safe screw ratio 520.

Safe material thickness ratio 510 defines a minimum required thickness of a material. Supposing that safe material thickness ratio 510 is "4 mm", a user cannot use a component less than 4 mm in thickness in the simulation. In a case where a component less than 4 mm in thickness is detected during or prior to the simulation, device 100 may output a warning to display 109.

Safe screw ratio 520 defines a minimum required screw diameter. Supposing safe screw ratio 520 is "3 mm", a user cannot use a screw less than 3 mm in diameter in the simulation. In a case where a screw less than 3 mm in diameter is detected during or prior to the simulation, device 100 may output a warning to display 109.

Figure 10:
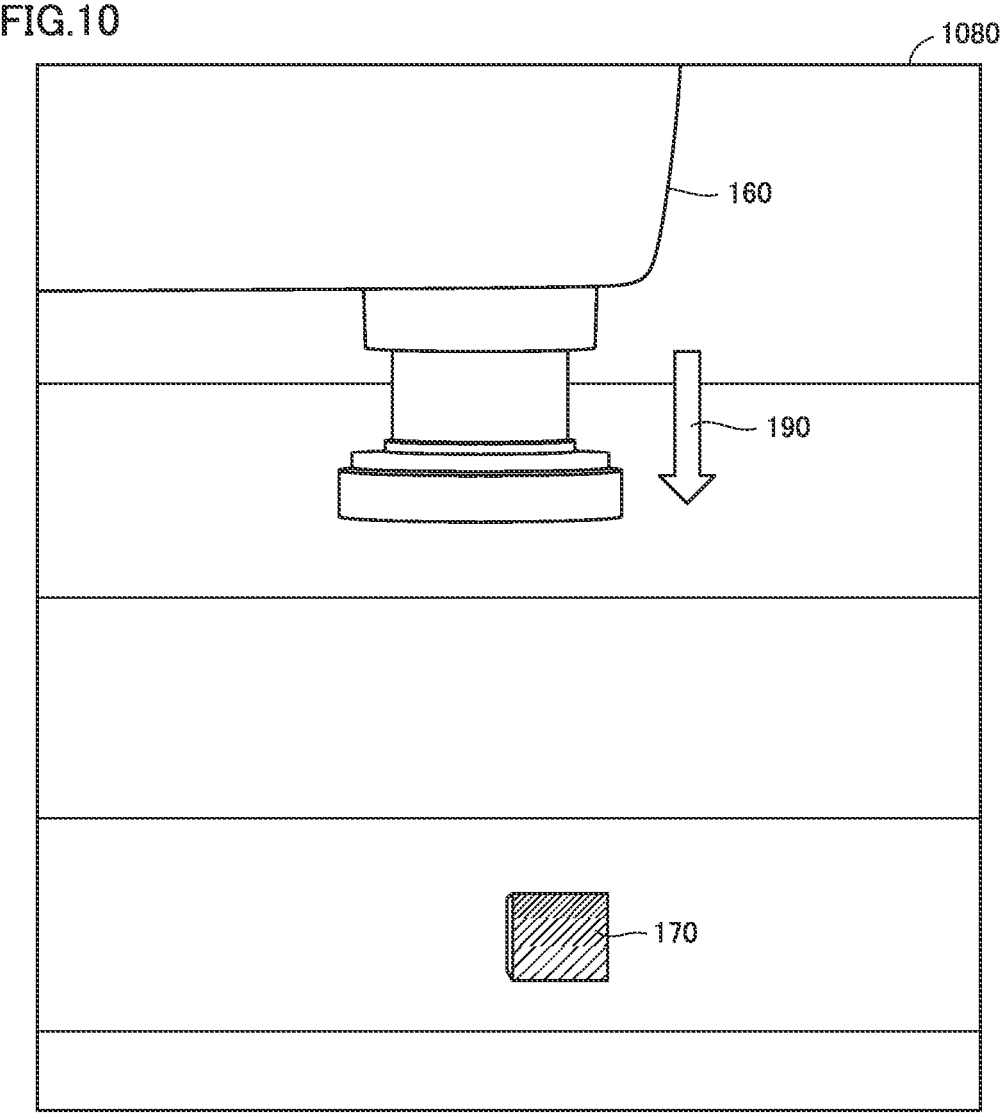
FIG. 10 is a diagram illustrating an example of a simulation screen 1080.
Figure 11:
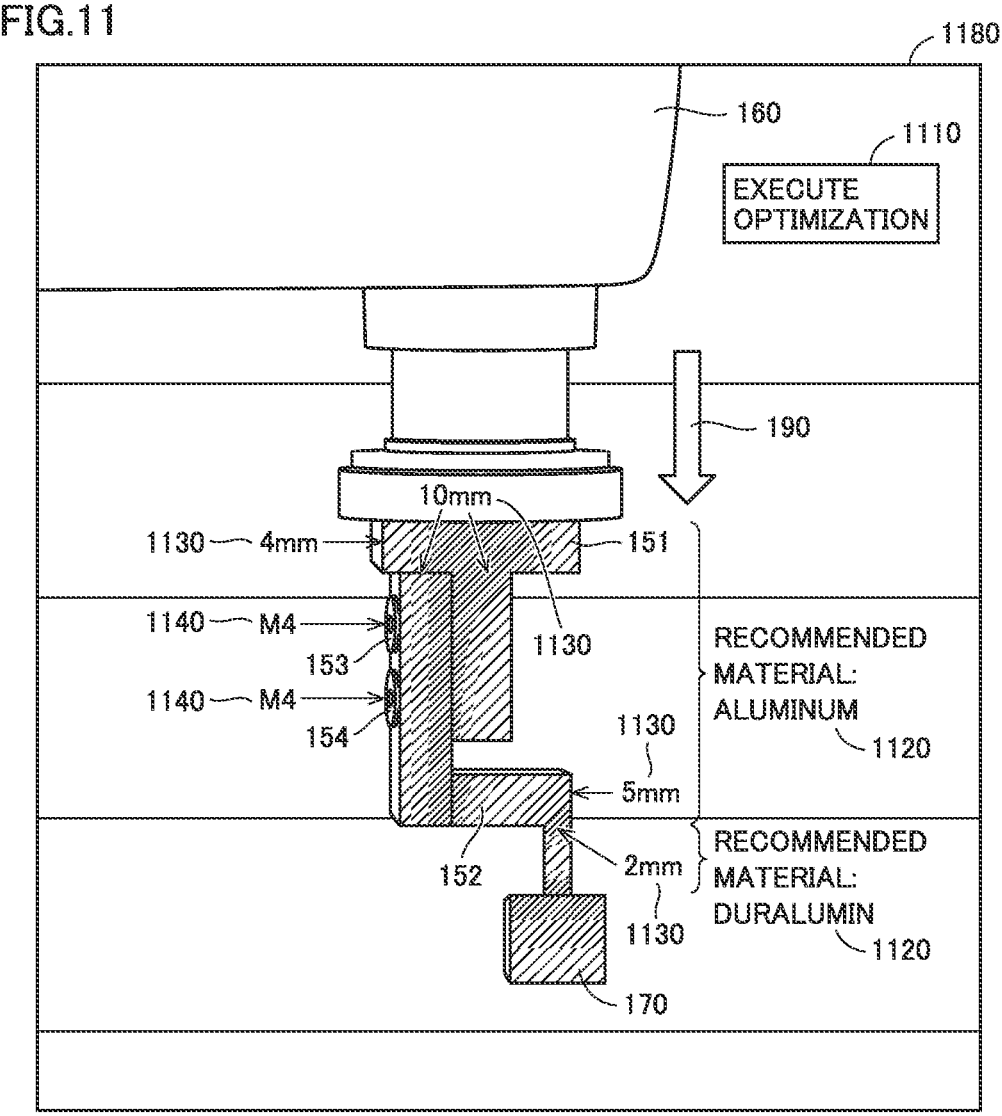
FIG. 11 is a diagram illustrating an example of a simulation screen 1180.

Safe material thickness ratio 510 and safe screw ratio 520 may be used in an optimization process described referring to FIGS. 10 and 11.

3D space display 502 displays an object (machine 150) necessary for the simulation. In an aspect, when device 100 executes a simulation in order to check stresses generated in components 151, 152, 153 and 154 of machine 150, 3D space display 502 may display only machine 150 and an object in contact with machine 150 (robot 160, work 170, and the like).

Figure 6:
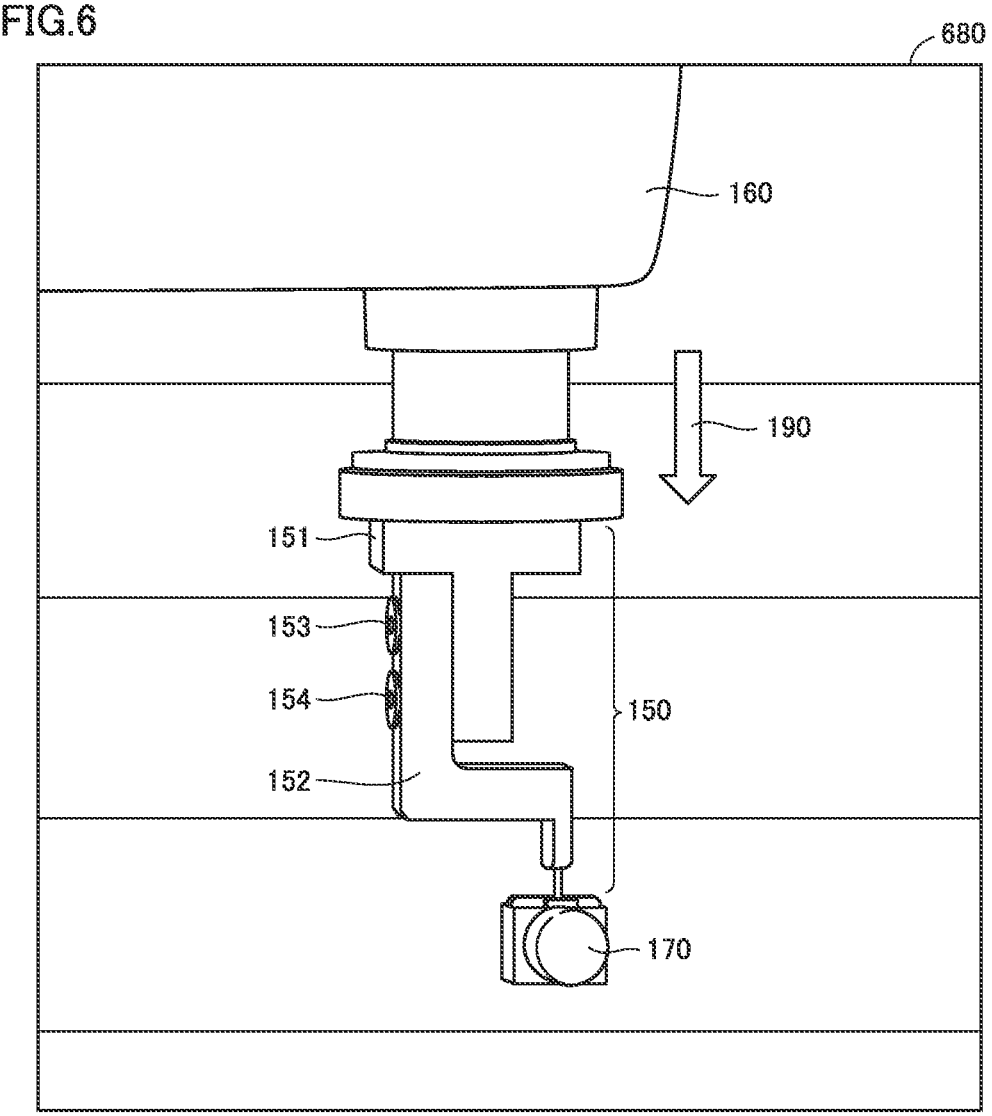
FIG. 6 is a diagram illustrating an example of a simulation screen 680.

FIG. 6 is a diagram illustrating an example of a simulation screen 680. Simulation screen 680 displays, for example, a simulation executed by device 100 based on settings on setting screen 500. In the example illustrated in FIG. 6, a snapshot at a moment when machine 150, which is a stress calculation target, moves downward 190 as driven by robot 160 and comes in contact with work 170.

Figure 7:
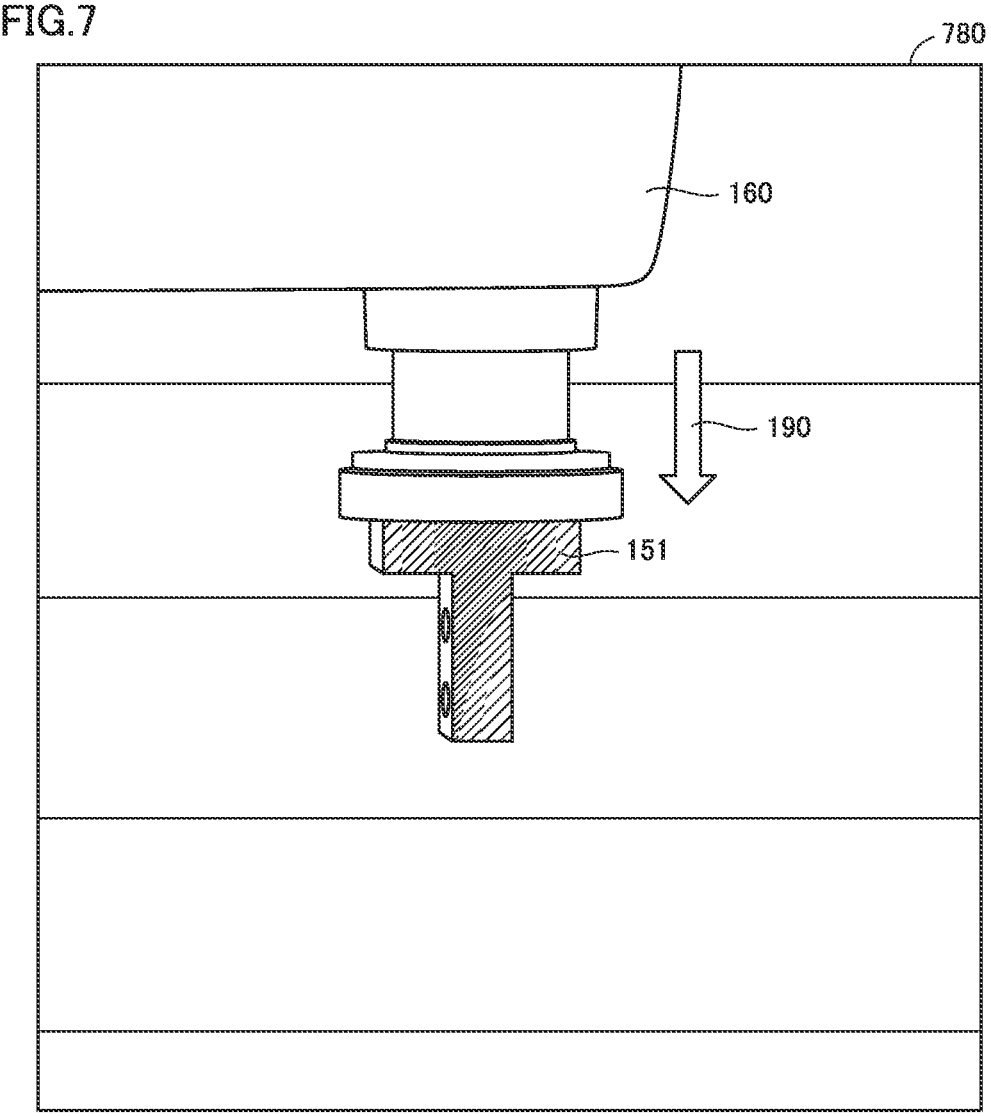
FIG. 7 is a diagram illustrating an example of a simulation screen 780.

FIG. 7 is a diagram illustrating an example of a simulation screen 780. Simulation screen 780 presents a visual display of a stress generated in component 151 of machine 150. Simulation screen 780 displays a stress generated in component 151 in the snapshot illustrated in FIG. 6. Thus, device 100 may display only a particular component on display 109 instead of the whole machine 150, thereby preventing a certain component(s) from being hidden behind the other components to be invisible from a user. This may allow a user to focus on a particular component.

Figure 8:
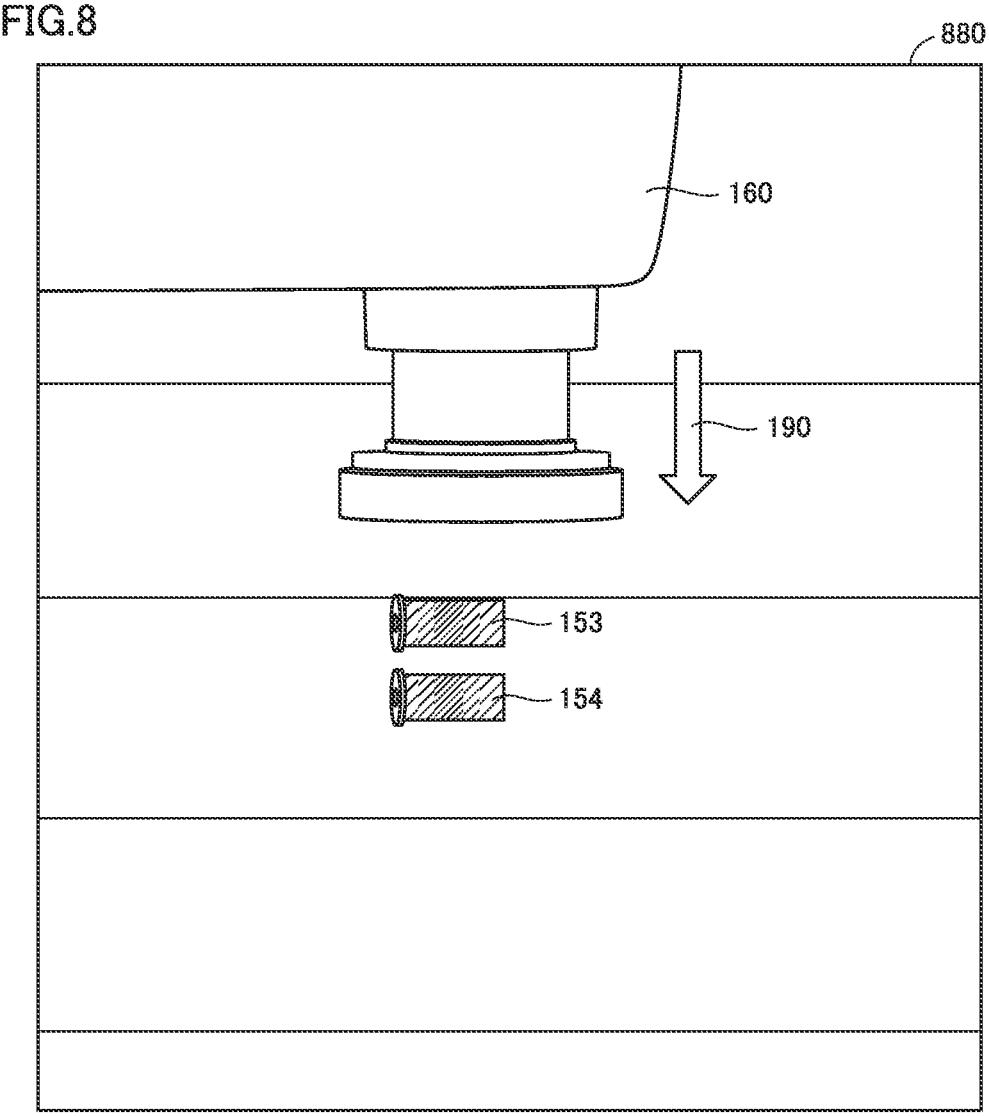
FIG. 8 is a diagram illustrating an example of a simulation screen 880.

FIG. 8 is a diagram illustrating an example of a simulation screen 880. Simulation screen 880 presents a visual display of stresses generated in components 153 and 154 of machine 150. Simulation screen 880 displays stresses generated in components 153 and 154 in the snapshot illustrated in FIG. 6.

Figure 9:
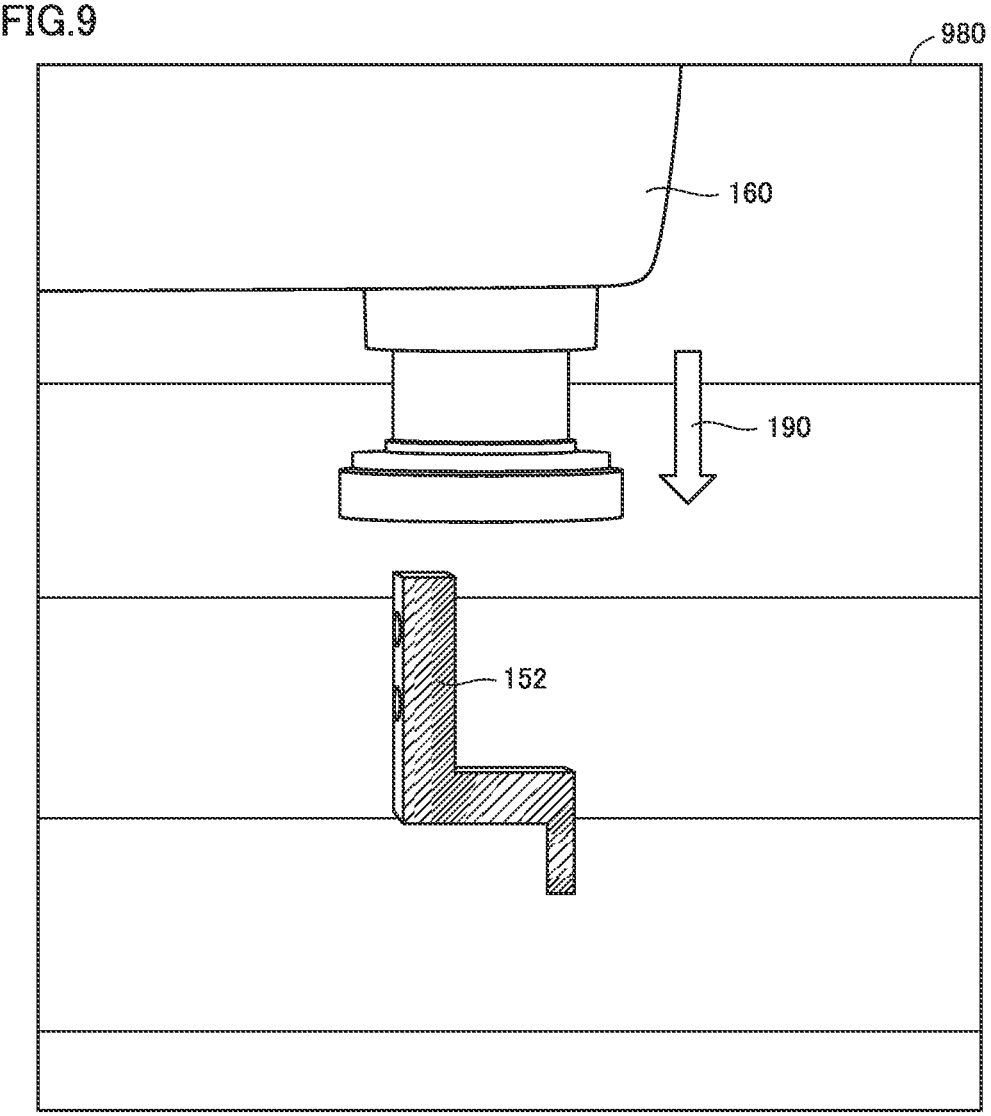
FIG. 9 is a diagram illustrating an example of a simulation screen 980.

FIG. 9 is a diagram illustrating an example of a simulation screen 980. Simulation screen 980 presents a visual display of a stress generated in component 152 of machine 150. Simulation screen 980 displays a stress generated in component 152 in the snapshot illustrated in FIG. 6.

FIG. 10 is a diagram illustrating an example of a simulation screen 1080. Simulation screen 1080 presents a visual display of a stress generated in work 170. Simulation screen 1080 displays a stress generated in work 170 in the snapshot illustrated in FIG. 6.

As illustrated in FIG. 1, device 100 may display the stresses generated in all the components on display 109. Device 100 may display, on display 109, the stress generated in work 170 or particular components 151, 152, 153 and 154, as illustrated in FIGS. 7 to 10. In an aspect, device 100 may suitably change what is displayed on display 109 based on a user's operation.

FIG. 11 is a diagram illustrating an example of a simulation screen 1180. Simulation screen 1180 includes an optimization button 1110. When it is detected that optimization button 1110 has been pressed down, device 100 optimizes components 151, 152, 153 and 154 of machine 150. The optimization process is carried out mostly in view of two aspects.

The first aspect is "safety rate". Device 100 optimizes components 151, 152, 153 and 154 so as to meet the safety rates set on setting menu 501. Further, device 100 optimizes components 151, 152, 153 and 154, so that the stress generated in each of these components does not exceed an allowable stress.

For instance, in a case where the stress generated in component 151 is found to exceed the allowable stress of component 151 as a result of the simulation, device 100 may increase the thickness of component 151 or change the material(s) of component 151 or may take both of these actions, as a part of the optimization process.

The second aspect is "cost". Device 100 changes the materials, equalizes component specs, equalizes the screw diameters, and/or reduce the number of components in order to reduce the manufacturing cost of machine 150 to the minimum insofar as machine 150 meets the required safety rate. When a product is assembled, its manufacturing cost generally reduces with fewer components. Device 100, therefore, may execute the optimization process so as to equalize the component types and materials of machine 150 as much as possible. In an aspect, the cost may be the manufacturing cost of device 100 or may be the man-hour cost (time) of device 100.

For instance, it is given that component 153 is an M5 (diameter: 5 mm) screw, and component 154 is an M4 (diameter: 4 mm) screw. It is further given that, as a result of simulation, components 153 and 154 are found to each meet the specified safety rate even if they are both M4 screws. In this case, device 100 may decide the use of M4 screw for both of components 153 and 154 in the optimization process.

Device 100 may, for example, execute the optimization process based on target functions expressed in formulas 101F to 105F below for component optimization. The formulas 101F to 105F are feasible in the form of a program.

[Numerical Expression 1]

$$f(x) = \min \sum_{n=1}^{N} \text{Force}\,(x) \qquad 101F$$

$$f(x) = \min \sum_{n=1}^{N} \text{Volume}\,(x) * \text{Price} \qquad 102F$$

$$f(x) = \min(\text{number of same material part}) \qquad 103F$$

$$f(x) = \max(\text{number of common material part}) \qquad 104F$$

$$f(x) = \min \sum_{n=1}^{N} \text{mass}\,(x) \qquad 105F$$

Variables included in the formulas 101F to 105F are as listed below.
x: material, parameter specified for each specs of component
N: number of components
n: product number of component
Force: largest value of stress generated in each component
Volume: component volume
Price: component material price Formula 101F seeks a component configuration that achieves the smallest stress value. Formula 102F seeks a component configuration that achieves the lowest material price Formula 103F seeks a component configuration that achieves the fewest components. Formula 104F seeks a component configuration that achieves as many components of the same kind possible (fewest types of components). Formula 105F seeks a component configuration that achieves the smallest mass of machine 150.

Device 100 may execute the optimization process based on, in part or in whole, the formulas 101F to 105F. Device 100 may apply weighting to any optional items such as safety rate, mass, and the number of components. In an aspect, device 100 may receive, through operation unit 106, an operation input from a user for formula selection or weighting. For instance, a user may apply weighting to items such as manufacturing cost, the number of components, and component types.

After executing the optimization process, device 100 may display, on simulation screen 1180, an obtained optimization result (information such as component parameter set (type and the like of each component), manufacturing cost, man-hour cost, the number of components, and the number of component types). The optimization result may include one or both of text information and 3D data. For instance, device 100 may display on simulation screen 1180 recommended material information 1120, recommended thickness information 1130, and recommended screw diameter information 1140 as the text information. In an aspect, device 100 may change the display of a component image (3D data) as recommended in the information. In another aspect, device 100 may further display, on simulation screen 1180, optional information such as manufacturing cost, man-hour cost, and the number of components and component types based on the suggested parameter set.

Figure 12:
FIG. 12 is a diagram illustrating an example of a component configuration changed as a result of an optimization process.

FIG. 12 is a diagram illustrating an example of a component configuration changed as a result of the optimization process. A component table 1210 shows the components prior to the optimization process. A component table 1220 shows the components after the optimization process. It is known from component table 1210 and component table 1220 compared against each other that device 100 uses aluminum as the material of components 151 and 152 for cost reduction. It is also known that device 100 changes the material of component 152 from duralumin to aluminum lower in strength and increases the thickness of component 152 in order to meet the required safety rate.

Device 100 displays component table 1220 after the optimization on display 109. In an aspect, device 100 may display, on display 109, both of component tables 1210 and 1220 before and after the optimization. In another aspect, device 100 may receive, from a user, an operation input for optimization do-over request. In this case, device 100 may execute the optimization process based on a parameter set newly specified by a user.

As described referring to FIGS. 11 and 12, device 100 optimizes the component configuration of machine 150 in view of the safety rate and cost. This may allow a user to select the component configuration reduced in manufacturing cost and meeting the specified safety rate.

D. Flowchart

Figure 13:
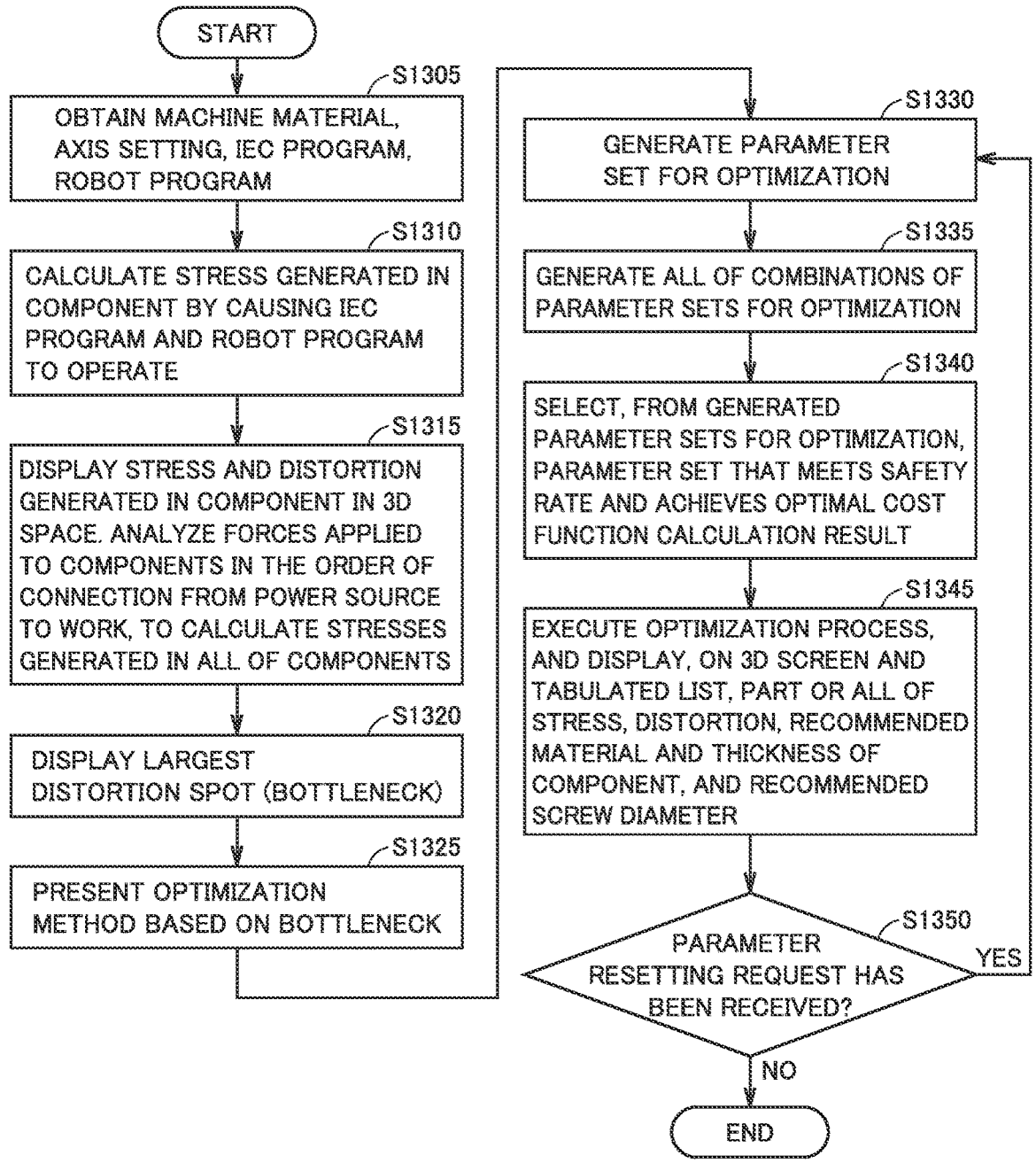
FIG. 13 is a flowchart illustrating an example of simulation steps of a device 100.

FIG. 13 is a flowchart illustrating an example of simulation steps of device 100, in an aspect, processor 102 may read, from storage 111 into main memory 104, a program for processing steps of FIG. 12 and then execute the stored program. In another aspect, the processing steps in whole or in part may be actualized in the form of circuit elements combined to execute these steps.

In step S1305, processor 102 obtains the materials of machine 150, axis setting for robot or the like, an international electrotechnical commission (IEC) program, and a robot program. In an aspect, processor 102 may obtain, through operation unit 106, network interface 110, optical drive 112 or local communication interface 116, the materials of machine 150, axis setting for robot or the like, IEC program, and robot program.

In step S1310, processor 102 causes the IEC program and robot program to operate to calculate a stress generated in each component.

In step S1315, processor 102 displays a stress and distortion generated in each component in the 3D space. Processor 102 may analyze forces applied to the components in the order of connection, starting with a component closest to a power source to a component closest to work 170, and thereby calculate stresses applied to all of the components.

In step S1320, processor 102 displays, on display 109, a spot at which the largest distortion is generated (bottleneck). In an aspect, processor 102 may display on display 109 a component in which a difference between a stress actually generated and its allowable stress is smallest or a component in which a stress actually generated exceeds its allowable stress, as the bottleneck. In another aspect, processor 102 may determine whether any one(s) of the components is a bottleneck by comparing an allowable stress of a target component to be determined against a stress generated in the target component. In this case, processor 102 may display such a bottleneck component, if any, on display 109.

In step S1325, processor 102 presents an optimization method based on the bottleneck. Specifically, processor 102, based on the bottleneck, may present a combination of the formulas 101F to 105F and a setting of weighting and the like applied to formulas the 101F to 105F.

In step S1330, processor 102 generates a parameter set for optimization. Specifically, processor 102 generates a parameter set based on component optimization parameter 137 and the stress generated in each component calculated in step S1315. The parameter set may include such items as sizes, specs, materials, minimum thicknesses, screw diameters, unit prices of components 151, 152, 153 and 154.

In step S1335, processor 102 generates all of combinations of parameter sets generated in step S1325.

In step S1340, processor 102 selects, among the generated parameter sets for optimization, a parameter set that meets the specified safety rate and that achieves an optimal target function calculation result. Specifically, processor 102 assigns the generated parameter sets for optimization to the formulas 101F to 105F and calculates these formulas, thereby obtaining the cost of each parameter set for optimization.

In step S1345, processor 102 executes the optimization process and displays a part or all of the stresses, distortions, recommended materials and thicknesses of the component, and recommended screw diameters, on the 3D screen and/or on a tabulated list (component table 1220).

In step S350, processor 102 determines whether a request for parameter resetting has been received. When it is determined that the parameter resetting request has been received (YES in step S1350), processor 102 makes the process proceed to step S1330. Otherwise (NO in step S1350), processor 102 ends the process.

In an aspect, processor 102, in response to the parameter resetting request being received, receives a new parameter set input from a user.

As described thus tar, device 100 according to this embodiment can calculate the stress generated in each of the plurality of components of machine 150 using the simulation. Thus, a user may check the stress generated in each component and design machine 150 that meets the safety rate by simply executing the simulation.

Device 100 executes the optimization process based on the bottleneck of machine 150. This may allow a user to easily redesign machine 150 so as to meet the specified safety rate and reduce its cost.

E. Supplementary Note

As described thus far, the embodiments disclosed herein include the following technical aspects.

Aspect 1

A simulation device (100), including:
a storage (111) configured to store assembly data of a machine (150) including a plurality of components (151, 152, 153, 154) and a program for control of a driver connected to the machine (150); and
a controller (102) configured to execute a simulation of the machine (150),
the controller (102) being configured to
 cause the driver to operate in the simulation, and
 calculate a stress generated in each of the plurality of components (151, 152, 153, 154) in the simulation in response to the driver being driven.

Aspect 2

The simulation device (100) according to aspect 1, wherein
the machine (150) is configured to come in contact with a work, and
calculating the stress generated in each of the plurality of components (151, 152, 153, 154) includes calculating a stress generated in each of the plurality of components (151, 152, 153, 154) and a stress generated in the work in response to contact of the machine (ISO) with the work.

Aspect 3

The simulation device (100) according to aspect 1 or 2, wherein
the controller (102) is configured to determine whether any one of the plurality of components (151, 152, 153, 154) is a bottleneck,
determining whether any one of the plurality of components (151, 152, 153, 154) is a bottleneck includes comparing an allowable stress of a target component to be determined among the plurality of components (151, 152, 153, 154) against a stress generated in the target component to be determined.

Aspect 4

The simulation device (100) according to any one of aspects 1 to 3, wherein
the controller (102) is configured to suggest a combination of the plurality of components (151, 152, 153, 154) based on a safety rate of each of the plurality of components (151, 152, 153, 154) and a target function for optimization of the plurality of components (151, 152, 153, 154).

Aspect 5

The simulation device (100) according to aspect 4, wherein
suggesting the combination of the plurality of components (151, 152, 153, 154) includes decreasing types of diameter sizes of screws to be used in the machine (150).

Aspect 6

The simulation device (100) according to aspect 4, wherein
suggesting the combination of the plurality of components (151, 152, 153, 154) includes decreasing types of materials to be used in the machine (150).

Aspect 7

The simulation device (100) according to aspect 4, wherein
suggesting the combination of the plurality of components (151, 152, 153, 154) includes reducing a manufacturing cost of the machine (150).

Aspect 8

The simulation device (100) according to aspect 4, wherein
the controller (102) is configured to output a parameter set for the combination of the plurality of components (151, 152, 153, 154) that has been suggested.

Aspect 9

The simulation device (100) according to aspect 8, wherein
outputting the parameter set includes outputting a table of the parameter set or displaying the parameter set on a simulation screen.

Aspect 10

A simulation method for a machine (150) including a plurality of components (151, 152, 153, 154), the simulation method including:
referring to assembly data of the machine (150) and a program for control of a driver connected to the machine (150);
causing the driver to operate in a simulation; and
calculating a stress generated in each of the plurality of components (151, 152, 153, 154) in the simulation in response to the driver being driven.

Aspect 11

A simulation program causing a computer to execute the program according to aspect 10.

Although the present invention has been described and illustrated in detail, it is clearly understood that the same is by way of illustration and example only and is not to be taken by way of limitation, the scope of the present invention being interpreted by the terms of the appended claims

What is claimed is:
1. A simulation device; comprising:
a storage configured to store assembly data of a machine including a plurality of components and a program for control of a driver connected to the machine; and
a controller configured to execute a simulation of the machine,
the controller being configured to:
cause the driver to operate in the simulation based on a weighting set by a user,
calculate a stress generated in each of the plurality of components in the simulation in response to the driver being driven,
suggest a combination of the plurality of components to the user based on a safety rate of each of the plurality of components and a target function for optimization of the plurality of components, and
perform an optimization do-over request in response to a new input from the user.
2. The simulation device according to claim 1, wherein:
the machine is configured to come in contact with a work, and
calculating the stress generated in each of the plurality of components includes calculating a stress generated in each of the plurality of components and a stress generated in the work in response to the contact of the machine with the work.
3. The simulation device according to claim 1, wherein:
the controller is configured to determine whether any one of the plurality of components is a bottleneck, and
determining whether any one of the plurality of components is the bottleneck includes comparing an allowable stress of a target component to be determined against a stress generated in the target component to be determined.
4. The simulation device according to claim 1, wherein:
suggesting the combination of the plurality of components includes decreasing types of diameter sizes of screws to be used in the machine.
5. The simulation device according to claim 1, wherein suggesting the combination of the plurality of components includes decreasing types of materials to be used in the machine.

6. The simulation device according to claim 1, wherein:
suggesting the combination of the plurality of components includes reducing a manufacturing cost of the machine.

7. The simulation device according to claim 1, wherein:
the controller is configured to output a parameter set for the combination of the plurality of components that has been suggested.

8. The simulation device according to claim 7, wherein:
outputting the parameter set includes outputting a table of the parameter set or displaying the parameter set on a simulation screen.

9. A simulation method for a machine including a plurality of components, the simulation method comprising:
referring to assembly data of the machine and a program for control of a driver connected to the machine;
causing the driver to operate in a simulation based on a weighting set by a user;
calculating a stress generated in each of the plurality of components in the simulation in response to the driver being driven;
suggest a combination of the plurality of components to the user based on a safety rate of each of the plurality of components and a target function for optimization of the plurality of components, and
perform an optimization do-over request in response to a new input from the user.

10. The simulation method according to claim 9, wherein:
the machine is configured to come in contact with a work, and
calculating the stress generated in each of the plurality of components includes calculating a stress generated in each of the plurality of components and a stress generated in the work in response to the contact of the machine with the work.

11. The simulation method according to claim 9, further comprising:
determining whether any one of the plurality of components is a bottleneck includes comparing an allowable stress of a target component to be determined against a stress generated in the target component to be determined.

12. The simulation method according to claim 9, wherein:
suggesting the combination of the plurality of components includes decreasing types of diameter sizes of screws to be used in the machine.

13. The simulation method according to claim 9, wherein;
suggesting the combination of the plurality of components includes decreasing types of materials to be used in the machine.

14. The simulation method according to claim 9, wherein:
suggesting the combination of the plurality of components includes reducing a manufacturing cost of the machine.

15. The simulation method according to claim 9, further comprising:
outputting a parameter set for the combination of the plurality of components that has been suggested.

16. The simulation method according to claim 15, wherein:
outputting the parameter set includes outputting a table of the parameter set or displaying the parameter set on a simulation screen.

17. A non-transitory computer-readable medium comprising instructions that, when executed by a simulation device, cause the simulation device to:
refer to assembly data of a machine and a program for control of a driver connected to the machine;
cause the driver to operate in a simulation based on a weighting set by a user; and
calculate a stress generated in each of a plurality of components in the simulation in response to the driver being driven,
suggest a combination of the plurality of components to the user based on a safety rate of each of the plurality of components and a target function for optimization of the plurality of components, and
perform an optimization do-over request in response to a new input from the user.

18. The non-transitory computer-readable medium according to claim 17, wherein:
the machine is configured to come in contact with a work, and
calculating the stress generated in each of the plurality of components includes calculating a stress generated in each of the plurality of components and a stress generated in the work in response to the contact of the machine with the work.

* * * * *